April 14, 1953 W. D. SHADWICK 2,635,004
HYDRAULIC HOIST MECHANISM FOR DUMP VEHICLES
Filed Dec. 14, 1948 3 Sheets-Sheet 1
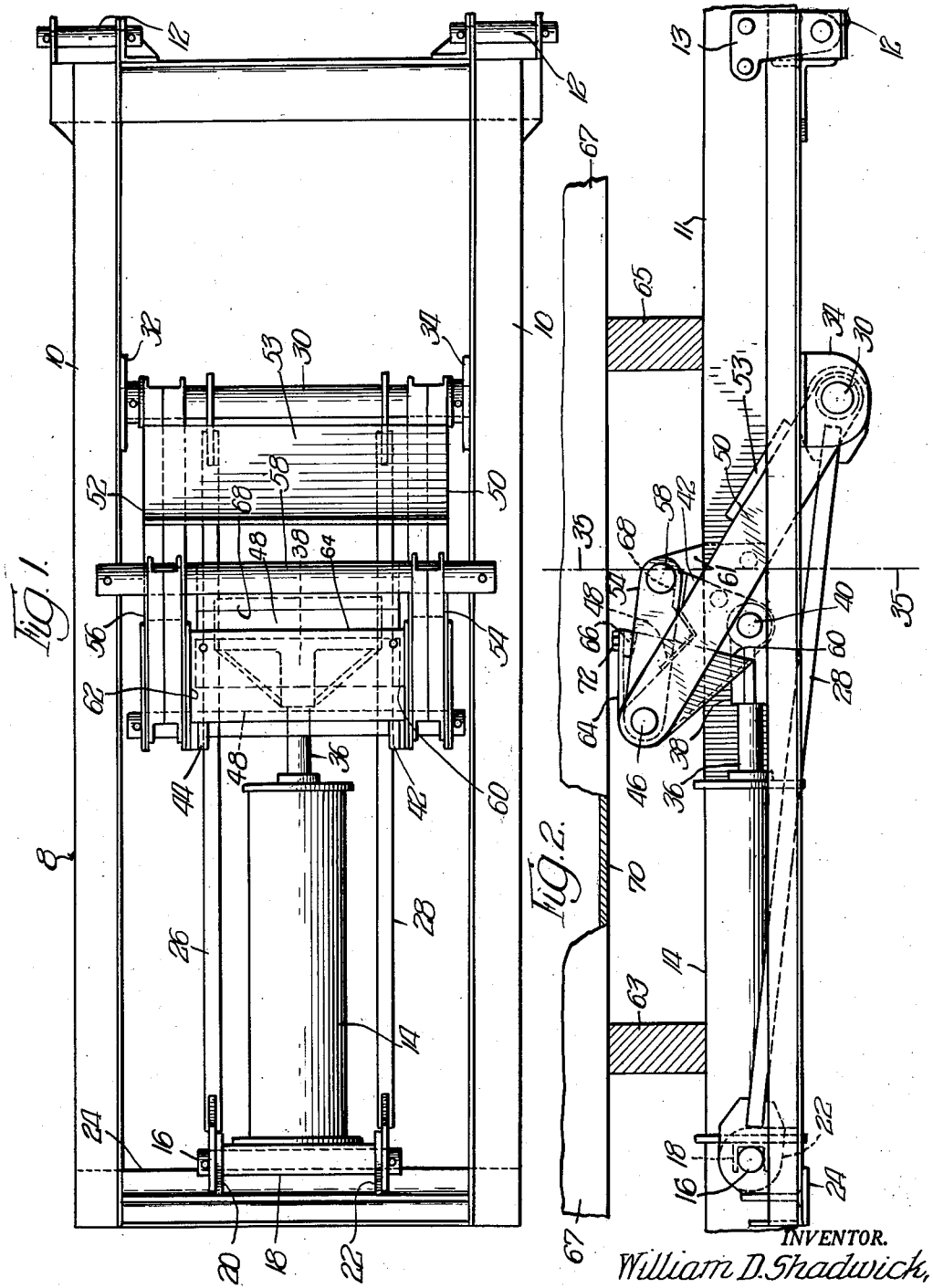
INVENTOR.
William D. Shadwick,
BY
Wilkinson, Huxley, Byron, & Hume
Attys April 14, 1953  W. D. SHADWICK  2,635,004
HYDRAULIC HOIST MECHANISM FOR DUMP VEHICLES
Filed Dec. 14, 1948  3 Sheets-Sheet 2
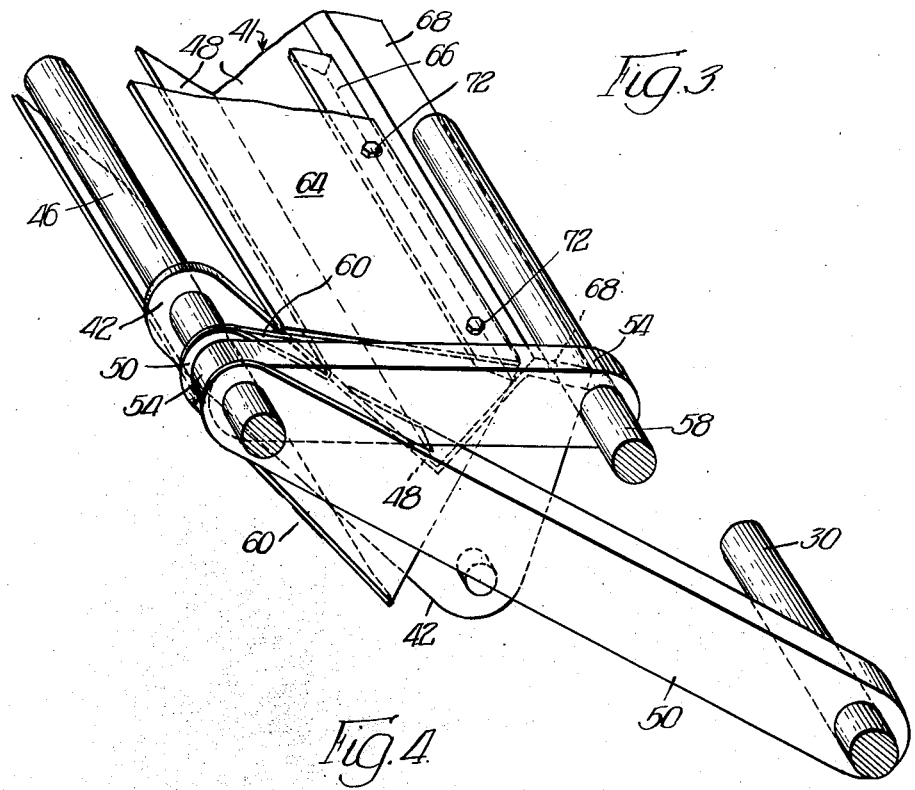
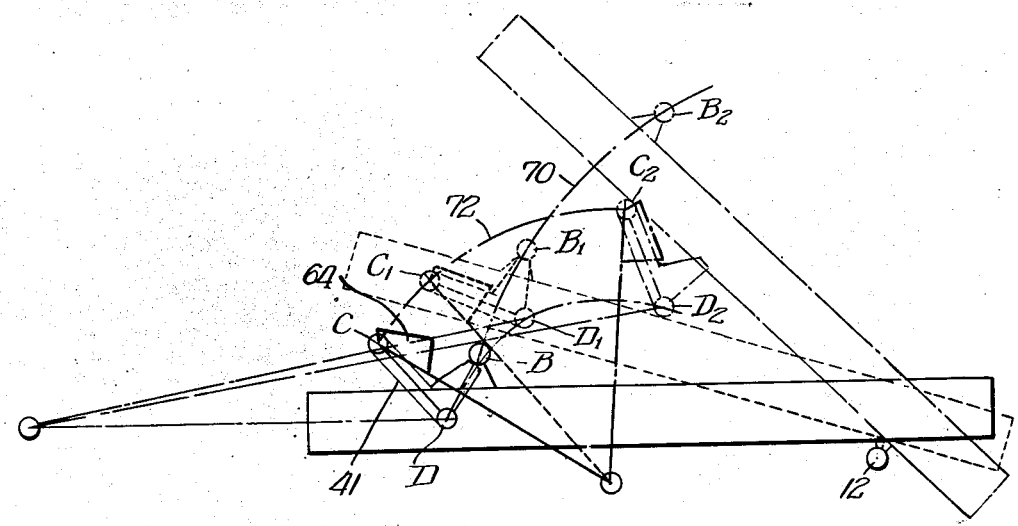
INVENTOR.
William D. Shadwick
BY
Wilkinson, Huxley, Byron, & Hume
ATTYS.

April 14, 1953     W. D. SHADWICK     2,635,004
HYDRAULIC HOIST MECHANISM FOR DUMP VEHICLES Filed Dec. 14, 1948     3 Sheets—Sheet 3

INVENTOR.
William D. Shadwick,
BY Wilkinson, Huxley,
Byron & Hume
ATTYS.

Patented Apr. 14, 1953

2,635,004

UNITED STATES PATENT OFFICE 2,635,004

HYDRAULIC HOIST MECHANISM FOR DUMP VEHICLES

William D. Shadwick, Council Bluffs, Iowa, assignor to Omaha Standard Inc., Council Bluffs, Iowa, a corporation of Iowa Application December 14, 1948, Serial No. 65,544

2 Claims. (Cl. 298—22)

This invention relates to improvements in hoist mechanisms generally and more particularly to hoists adapted to act as load dumping mechanisms for vehicles having a tiltable body. More specifically, this invention relates to a hoist which incorporates a dual leverage mechanism interposed between the chassis of a truck and the truck body, which mechanism operates to pivot the truck body on hinge members secured at the rear extremity of the truck chassis.

One of the disadvantages of present modes of construction of hoisting mechanisms of this type is that the initial thrust of the hydraulic piston assembly or like thrust transmitting member is applied in such a manner that the hinge members which provide a pivotal connection between the truck chassis and the truck body are subject to very heavy strains at the beginning of the lifting cycle. This is ordinarily true, since a low initial mechanical advantage of lift is secured at this portion of the lifting cycle where the load resistance is greatest.

Another disadvantage of present constructions of such mechanisms is that because of their design, they normally have an inherent instability with regard to lateral thrust forces which are present whenever the truck chassis is not substantially level during operation of the hoisting mechanism. Such lateral forces can be highly destructive in that if they increase beyond the low limit of rigidity of the mechanism, the complete collapse in a lateral direction of the hoisting mechanism, and therefore the truck body, may occur. Even if such lateral forces are not sufficient to bring about an actual collapse of the mechanism, they may produce undesirable variations in the alignment of the mechanism which often result in damage to the thrust arm which is normally in the form of an hydraulic piston or equivalent mechanical device. This type of damage is difficult to obviate by alterations in the structure of the piston and its associated parts since it is not practical to have the piston mounted to pivot in other than a vertical plane.

It is therefore an object of this invention to provide a hoisting mechanism of the character described which has a dual linkage structure in that all of the linkage elements are provided in the form of laterally spaced and integrally supported pairs. Such a design permits the use of a so-called "box structure" for the linkage elements which structure provides a rigid attachment of the right and left hand components of the hoisting linkage, which in turn results in a maximum stability of the body and load at all positions in the lifting cycle. This feature substantially eliminates the possibility of the type of damage noted above which is often brought about by hoisting loads on hillsides or uneven terrain.

Another object of this invention is to provide a hoisting mechanism of the character described which includes a dual leverage arrangement through which a high initial mechanical advantage of lift is secured at the beginning of the lifting cycle, at the time the load resistance is greatest, and which automatically provides for a lower mechanical advantage at a point in the lifting cycle where the load resistance is substantially reduced. By use of this dual leverage principle, a relatively low hydraulic head pressure is achieved through the entire cycle of the dumping operation even though the dumping angle is relatively high. Not only is the head pressure relatively low but it is also substantially constant so that the application of energy throughout the tilting movement of the body is more nearly equalized.

Thus the hoist mechanism which is the subject matter of this invention may be characterized as a dual leverage mechanism as well as a dual linkage system.

The dual leverage character of the mechanism which is the subject matter of this invention also results in a signficant improvement with respect to the heavy strain normally produced by conventional mechanisms on the hinge members with which the truck body is pivotally secured to the truck chassis. During the initial stages of the lifting cycle, the direction of application of force to the truck body is substantially vertical when a mechanism embodying the present invention is utilized. Since this force is applied at approximately the center of gravity of the truck body, there is very little force applied to the hinge members at this stage in any direction. As a matter of fact, the hinge members have practically no function during the initial stages of the lifting cycle. The hinge members could actually be disconnected and the first portion of the lift carried out in substantially the same way as it normally takes place when the hinge members are connected if the lifting force is applied at a point only slightly in front of the center of gravity. This of course is a distinct improvement over the usual application of the initial thrust in presently used hoisting mechanisms which are often designed in such a way that when an attempt is made to lift unusually heavy loads, the hinge members are subjected to undue stress.

It is therefore still another object of this invention to provide a dual leverage mechanism in which the leverage is such during the first portion of the lifting cycle that substantially no component of force is created which will tend to develop a destructive stress upon the pivotal connection between the hoisting mechanism and the loaded truck body.

Still another object of this invention is to provide in the hoisting mechanism described a positive and relatively simple method for increasing the angle reached by the truck body at the end of the dumping cycle, which adjustment facilitates the dumping of wet or sticky loads, or the like. The means for accomplishing this increase in the terminal angle of the truck body in the dumping cycle is carried out by a simple adjustment which does not involve altering the normal hoisting linkage in any way.

Another object of this invention is to provide a hoisting mechanism of the character described which can be readily adapted to existing or standard chassis and bodies without materially increasing the normal space between the truck chassis and the truck body.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a plan view of one form of a hoist dumping mechanism embodying this invention adapted to be mounted between the chassis and the body of a truck.

Figure 2 is a side elevation of the dumping mechanism shown in Figure 1, mounted in relation to a fragmentary portion of one of the body run sills and two body floor sills of a truck.

Figure 3 is a perspective view of a fragmentary portion of the dumping mechanism shown in Figure 2.

Figure 4 is a diagrammatic representation of the cycle of operation of the dumping mechanism as the dump body is raised from the normal to dumping position.

Figure 5:
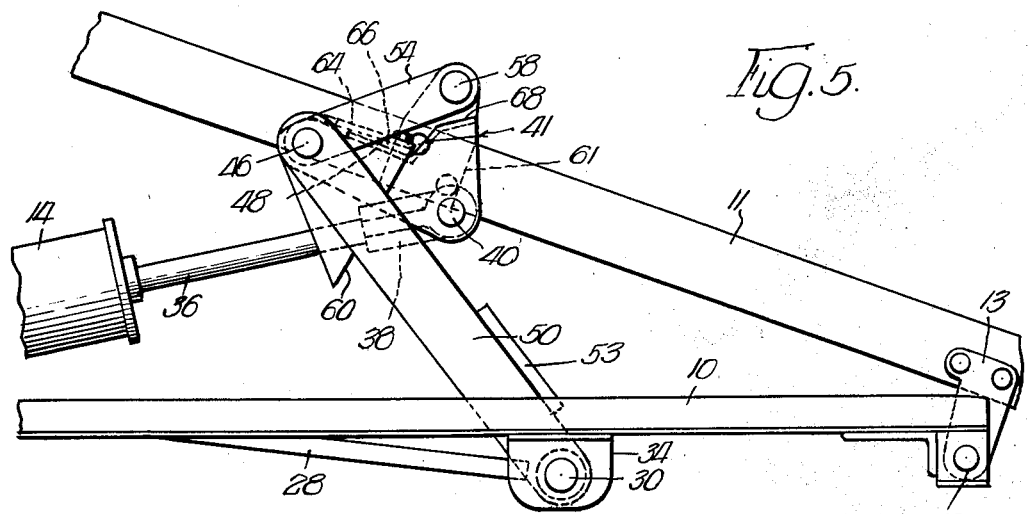
Figure 5 is a side elevation of a fragmentary portion of the dumping mechanism shown in Figure 1, the lifting apparatus being shown in an intermediate position.
Figure 6:
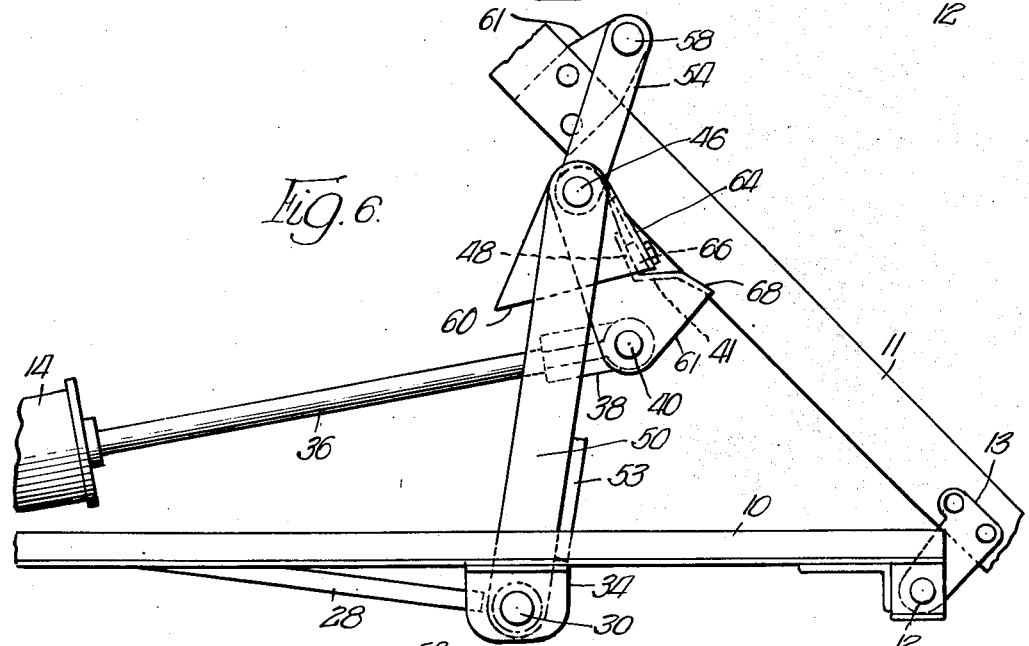
Figure 6 is a side elevation of a fragmentary portion of the dumping mechanism shown in Figure 1, with the lifting apparatus shown in the fully lifted position; and, Figure 7 is a fragmentary view partly in elevation and partly in vertical section of a portion of the linkage assembly in a position shown in Figure 5.
Figure 7:
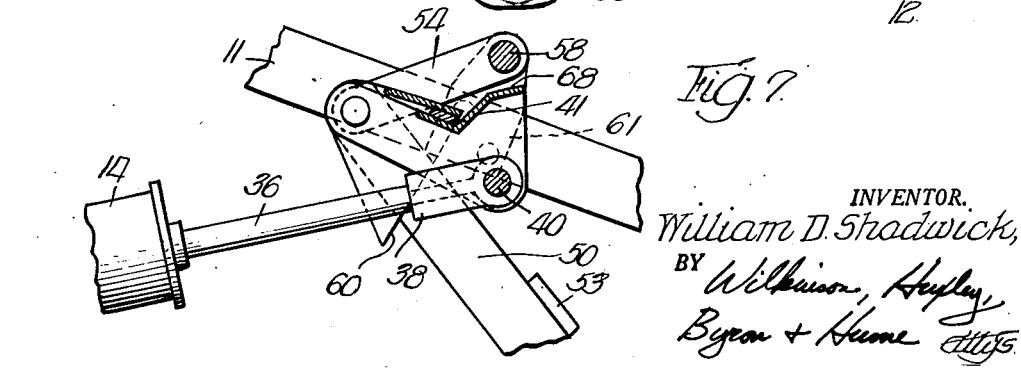

Referring now to Figure 1, the numerals 10—10 are used to generally designate that portion of the hoist frame which is adapted to be attached directly to the truck chassis as shown in Figure 2. The truck chassis longitudinals may be cut if necessary so that the hoist hinge members 12—12 are adjacent to the rear end of these members when the hoist mechanism is otherwise properly disposed. The body run sills of the body platform, such as sill 11 shown in Figure 2, have the body hinge members 13—13 mounted at a suitable point thereon, between the center and rear ends, which members together with the hoist hinge members 12—12 provide a means of pivotally mounting the dump body to the chassis. Obviously the hoist mechanism could be mounted directly on the truck chassis without the use of the hoist frame. The members which are shown attached to the hoist frame would then be secured to the truck chassis itself and the hoist frame would be eliminated entirely. The construction of the mechanism shown including the hoist frame provides an assembly which can be readily mounted on all standard types of truck chassis without the necessity of making any major modifications other than the possible cutting of the longitudinals, as mentioned above.

The end of the hoist frame opposite to that having the hinge members 12—12 thereon has the hydraulic cylinder 14 pivotally secured thereto so that the cylinder is free to pivot in a substantially vertical plane, the form and mounting of the cylinder being more or less conventional. The hydraulic cylinder base support shaft 16 is adapted to be received by the U-shaped or equivalent coupling 18 secured to the base of the cylinder 14, as best shown in Figure 2, and the support shaft 16 is, in turn, journaled in the supporting flanges 20 and 22 which are rigidly secured to the crossbeam 24 of the hoist frame. The two tension bars 26 and 28 may be mounted between shafts 16 and 30 in such a manner as to absorb the thrust of the hoist pressure between these points which would otherwise be transmitted to the hoist frame members 10—10 or the truck chassis itself. The shaft 30 may be attached to flanges 32 and 34, which may, in turn, be rigidly secured to the hoist sills 10—10 and extend downwardly therefrom at a point behind the rear axle of the truck, as best shown in Figure 2, the line 35—35 being the center line of the axle.

It is obvious that the position of the shaft 30 with respect to the vertical may be varied in different installations to produce the effect desired. For example, the flanges 32 and 34 may be eliminated and the shaft attached directly to the hoist sills 10—10. Of course the position similar to that shown in Figure 2 is often preferable, since dropping the shaft 30 gives a better angulation in the hoisting mechanism. In addition, the position of the shaft 30 can be varied with respect to the horizontal to a considerable degree, since the design of the mechanism is such that the shaft will normally be located behind the rear axle of the truck which area is normally free from obstructions that would limit the placement of the shaft. This is a significant characteristic of the applicant's device, since the area in front of the rear axle on most trucks has numerous obstructions therein and it is often difficult to utilize a hoist mechanism of the exact design desired since the design must be modified in order to avoid these obstructions. It is often particularly difficult to obtain the desired angulation, for example. Needless to say, although applicant's device is particularly adapted for this type of mounting where the shaft 30 is behind the rear axle, such a type of mounting is not necessarily required and if the vehicle has a design which calls for a mounting of the dumping mechanism at a point in front of the rear axle, such an installation can readily be made, the vertical disposition of the shaft 30 being altered if necessary.

Although it is not shown, a suitable valve mechanism for controlling the admission of some hydraulic means into and from the cylinder, together with a suitable pump for applying hydraulic pressure, may be used in the conventional manner in cooperation with the hydraulic cylinder 14. These components normally will be adjacent the end of the cylinder 14 which is mounted on the shaft 16.

The hydraulic cylinder 14 has the conventional piston mounted therein which is adapted to move the piston rod 36 axially when the pump and valve mechanism are suitably operated. The outer end of the piston rod 36 has a thrust head 38 mounted thereon which thrust head may be substantially T-shaped and adapted to carry the thrust head shaft 40. This shaft 40 is mounted in the thrust head substantially at right angles to the piston rod 36 and is adapted to act through the shaft 40 upon a thrust arm assembly, indicated generally in Figure 3 by the numeral 41, which assembly consists of the L-shaped links 42 and 44 (Figure 1) and the web 48 which is secured to and extends between said links and is substantially co-extensive with the edges of each of these two links which are uppermost when the mechanism is in the unhoisted position as shown in Figure 2. The upper extremities of the links 42 and 44 are in turn pivotally mounted on the pivot cross-shaft 46 which is disposed substantially parallel to the shaft 40.

Although the thrust arm assembly 41 is here shown (Figures 1 and 3) as comprising the two L-shaped links 42 and 44 together with the web 48 secured there between, it is clear that this assembly could be formed as a unit. For example, it could be formed as a single L-shaped arm sufficiently broad to insure stability, which arm could act on the shaft 58 substantially in the same fashion as the thrust arm assembly described above.

A second pair of links 50 and 52 have their ends pivotally mounted in spaced relation on the main cross-shaft 30 as best shown in Figure 1 and have their opposite ends pivotally mounted on the pivot cross-shaft 46. In the unhoisted position of the dump body the links 50 and 52 normally extend from the main cross-shaft 30 generally in the direction of the hydraulic cylinder 14 as shown in Figure 2. The links 42 and 50 together with links 44 and 52 therefore form a two-sided linkage system acting between the thrust head shaft 40 and the main cross-shaft 30 through cross-shaft 46.

It should be noted that because of the novel character of applicant's construction, the two sides of the linkage system can be made even more rigid than would normally be the case by providing reinforcing members such as the web 53 shown in Figure 1 which extends between and is secured to the links 50 and 52 adjacent the ends thereof which are mounted on the shaft 30. Likewise a similar web could be secured between the links 54 and 56 adjacent the ends thereof which are pivotally secured to the shaft 58. Such reinforcements can be incorporated in a hoist mechanism embodying applicant's invention, since the design is such that at no time does the thrust head 38 or the piston 36 interfere with the normal path of any of the other cross-shafts which form a part of the mechanism. This advantage is obtained largely through the unusual disposition of the links 50 and 52 together with the shaft 30.

In addition, the pivot cross-shaft 46 has a third pair of links 54 and 56 pivotally mounted at one end thereon in spaced relation to each other. The opposite ends of these links are pivotally mounted on the upper cross-shaft 58, which shaft may be in turn secured at each end to a flange, such as the flange 61, mounted on and extending upwardly from each of the body run sills. Obviously if it is desirable, the upper cross-shaft 58 could be secured at each end to the body run sills directly. Here again the choice of exact construction depends greatly on the angulation desired and other features which will normally vary considerably, depending on the exact environment in which the hoist mechanism is to be used. A fragmentary portion of one of these body run sills 11 and its associated flange 61 together with the body floor cross beams 63 and 65 and a fragmentary portion of one side 67 and the floor 70 of the dump body of the truck are shown in Figure 2. In the normal or unhoisted position of the dumping mechanism as shown in this figure, the links 54 and 56 extend from the shaft 46 toward the rear of the truck chassis, and form a relatively small angle with the links 50 and 52 respectively. In addition, the upper cross-shaft 58 is disposed so that it is directly above the outer extremity of the lower arms of the L-shaped links 42 and 44 when the mechanism is in this position.

The links 50 and 52 have secured thereto, adjacent their upper ends, the substantially triangularly shaped plates 60 and 62, which plates have the thrust web 64 extending there between and attached along their upper edges, this web therefore being adapted to intercept the web 48 when links 42 and 44 are pivoted in an upward direction about the pivot cross-shaft 46. A pitch plate 66 may also be provided to be removably secured to the web 64 for purposes which will later appear.

The exact structure of the link mechanism together with its various cooperative elements is perhaps best shown in Figure 3.

The normal position of the hoisting mechanism is shown in Figures 1 and 2 and it will be observed that in such position the hoisting mechanism is of such a configuration that it is well adapted to be disposed between the body run sills and the cross sills of the body platform, and in such a compact manner that only a small portion extends a short distance below the run sills at a point behind the truck rear axle. Of course, if greater angulation is desired and the compactness of the mechanism is relatively unimportant, the shaft 30 may be lowered further than shown. In this unhoisted position the body run sills normally are disposed on the hoist frame members 10—10 and the upper cross-shaft 58 is substantially aligned with the thrust plate 68 which is that portion of the web 48 which extends between the upper extremities of the shorter arms of the substantially L-shaped links 42 and 44. This thrust plate 68 is adapted to thrust against the upper cross-shaft 58 during the initial cycle of operation of the hoisting mechanism, so that pivotal movement of the links 42 and 44 will raise the shaft 58, and therefore the body of the truck.

With reference to the actual operation of the hoisting mechanism, when the pump and valve mechanism described above are properly activated, hydraulic pressure is applied to the cylinder and the piston working therein is moved toward the rear of the chassis. This motion of the piston in turn causes the piston rod 36 to move axially in the same direction. Piston rod 36 carries with it the thrust head 38 which has the thrust head shaft 40 secured thereto. The motion of the shaft 40 is transmitted to the thrust head assembly 41 which in turn pivots about the cross-shaft 46. This pivotal motion of the thrust head assembly 41 about the shaft 46 causes the portion 68 of the web 48 to thrust upward against the upper cross-shaft 58, and as the pivotal movement of these links continues, the upper cross-shaft 58 is moved upwardly in a nearly vertical direction. This movement of the upper cross-shaft 58 in turn causes the tilting of the dump body around the hinge members 12.

The diagrammatic representation in Figure 4 illustrates the motion of the various components of the hoisting mechanism throughout the application of thrust by the piston rod 36. The initial position of the upper cross-shaft 58 is represented by the letter B and the intermediate and final positions by the letters $B_1$ and $B_2$ respectively. Likewise the corresponding positions of the thrust head shaft 40 and the pivot cross-shaft 46 are represented by the letters D, $D_1$, $D_2$, and C, $C_1$, $C_2$ respectively. As shown in this figure, the upward movement of the upper cross-shaft 58 is in the arcuate path 70.

The upward displacement of the upper cross-shaft 58 is accompanied by a less pronounced upward displacement of the pivot cross-shaft 46 along the substantially arcuate path 72, shown in Figure 4. At the same time the upper ends of links 50 and 52 are moved along the same path 72 and the ends of the links 54 and 56 which are secured to the upper cross-shaft 58 move along the path 70. The movement of these pairs of links along these paths results in an increase in the angle formed therebetween. Simultaneously the links 42 and 44 are pivoted about the pivot cross-shaft 46 in a way which tends to decrease the angle between the web 64 extending between the links 50 and 52 and the web 48 extending between the links 42 and 44. After the latter links have pivoted a sufficient amount relative to the former, the two webs 48 and 64 move into abutting relation and further independent movement of the links 42 and 44 relative to the links 50 and 52 in that direction is therefore prevented.

When this point in the cycle of operation has been reached, if the axial movement of the piston rod 36 is continued, the upper cross-shaft 58 moves out of contact with the portion 68 of the web 48 and the links 50 and 52, together with links 54 and 56, form a new toggle action system which continues the tilting of the dump body, the activating thrust being applied through the links 42 and 44 at the pivot cross-shaft 46. The final position of the upper cross-shaft 58 in the dumping cycle is shown by the letter $B_2$ in Figure 4 while the final position of the pivot cross-shaft 46 and the thrust head shaft 40 is shown by the letters $C_2$ and $D_2$ respectively. It should be noted that once the upper limit of travel of the links 42 and 44 relative to the links 50 and 52 has been reached, the disposition of these links remains substantially the same throughout the rest of the lifting cycle, whereas the links 54 and 56 continue to pivot in the same direction about the pivot cross-shaft 46.

The resulting operation of the lifting mechanism from these various movements of the component links is highly desirable. A high initial mechanical advantage of lift is secured at the beginning of the lifting cycle where the load resistance is greatest by the cooperative action of the links 42 and 44, the thrust plate 68 and the upper cross-shaft 58. Subsequently an automatic transfer to a lower mechanical advantage toggle system is brought about by the interaction of the web 48 and the web 64 as described above.

The use of this dual leverage principle enables the utilization of a relatively low hydraulic head pressure throughout the entire cycle of the dumping mechanism. Applicant has conducted a number of experiments with conventional types of hydraulic hoists of the character described to establish a comparison with a mechanism embodying this invention. The following table, for example, shows the relative pressure required to raise a 20,000 pound payload using the best available standard hydraulic hoist (comparable to applicant's mechanism) and a hoist embodying applicant's invention. The pressures shown were obtained from actual operation with a payload of a damp sand and gravel mix on a 12 foot body.

| Angle of Body | Pressure Required, Conventional System (lbs. per sq. in.) | Pressure Required, Dual Leverage System (lbs. per sq. in.) |
|---|---|---|
| 0° | 1,375 | 850 |
| 5° | 1,175 | 750 |
| 10° | 950 | 600 |
| 15° | 850 | 575 |
| 20° | 800 | [1] 800 |
| 25° | 650 | 650 |
| 30° | 560 | 560 |
| 35° | 525 | 525 |
| 40° | 475 | 475 |

[1] Beginning of second leverage cycle.

It will be noted that the pressure required in the hoisting mechanism of conventional design starts at 1375 pounds per square inch and decreases gradually throughout the lifting cycle to a pressure of approximately 475 pounds per square inch. Applicant's device, on the other hand, requires an initial pressure of only 850 pounds per square inch, which pressure decreases gradually during the initial portion of the lifting cycle while the upper cross-shaft 58 is in contact with the thrust plate 68. This portion of the lifting cycle in applicant's device represents a lift of approximately 15 degrees. At the end of this initial cycle, when the webs 48 and 64 come together, the necessary pressure rises rapidly to approximately 800 pounds per square inch and then gradually decreases in substantially the same fashion as the pressure in the conventional type of hydraulic hoist. The pressure in the conventional type of hoist is thus seen to vary from 1375 pounds to 475 pounds, while the variation in applicant's is only from 850 pounds to 475 pounds. Not only is the pressure required much lower than that of the conventional type mechanism, but the range of pressures required is much smaller which more nearly equalizes the application of pressure throughout the lifting cycle. These characteristics of applicant's hoisting mechanism are obviously extremely desirable from the standpoint of efficiency and design of the equipment.

As mentioned above, the pitch plate 66 may be inserted in the mechanism by mounting it as indicated in Figures 2 and 3 on the under surface of the web 64 adjacent the trailing edge thereof by any suitable means, such as the bolts 72. By so inserting the pitch plate, the dumping angle of the hoist can be materially increased without altering the hoisting linkage. The presence of the pitch plate has the effect of shortening the angle through which the dump body is raised by direct operation of the thrust plate 68 on the upper cross-shaft 58 and at the same time of increasing the angle through which the dump body is moved during the second cycle of operation of the leverage mechanism described above by approximately twice the number of degrees which the first cycle of the lift is shortened. More specifiically, if the first cycle of the lift is shortened by 5 degrees by insertion of the pitch plate 66, the second cycle of the lift will be lengthened by approximately 10 degrees. The shortening of the first cycle results in a lengthening of the second cycle since there is a fixed amount of piston travel available. If the portion of the full piston stroke used up in the first cycle is shortened, the portion available for the second cycle is automatically increased. As previously indicated, this characteristic of the mechanism provides a positive and relatively simple method for increasing the final angle reached by the truck body by operation of the dumping mechanism, which characteristic is extremely useful when dealing with certain types of loads.

Although the hoist mechanism is here shown in connection with a dump truck, it is obvious that other applications of the mechanism could be made.

The drawing and the above discussion are not intended to represent the only possible form of this invention, in regard to details of construction. Changes in form and in the proportion of parts, as well as the substitution of equivalents are contemplated, as circumstances may suggest or render expedient, without departing from the spirit or scope of this invention as further defined in the following claims.

What is claimed is:

1. In a hoist adapted to be used in combination with a supporting member and an object to be hoisted, a pair of lift link systems disposed on relatively opposite sides of said supporting member, each link system comprising a pair of links, the links in each pair of links being pivotally connected together in toggle arrangement on a movable axis common to both link systems and having their opposite ends pivotally connected respectively to said supporting member and to said object to be hoisted, a power actuated connecting link having one end pivotally connected to said movable axis, a thrust transmitting member pivotally secured to the other end of said power actuated connecting link, said connecting link being formed and disposed so said other end thereof moves upwardly in direct lifting relation with said object to be hoisted as said connecting link is pivoted by said thrust transmitting member, and an abutment member interconnecting the links in said pair of link systems which are pivotally connected to said supporting member, said abutment member being adapted to intercept said connecting link after it has been pivoted as described by said thrust transmitting member, and said other end thereof has moved upwardly in direct lifting relation with said object to be hoisted.

2. In a hoist adapted to be used in combination with a supporting member and an object to be hoisted, a pair of lift link systems disposed on relatively opposite sides of said supporting member, each link system comprising a pair of links, the links in each pair of links being pivotally connected together in toggle arrangement on a movable axis common to both link systems and having their opposite ends pivotally connected respectively to said supporting member and to said object to be hoisted, a substantially L-shaped connecting link having one arm thereof pivotally connected at one end to said movable axis, a thrust transmitting member pivotally secured to said connecting link at the angular portion thereof, said connecting link being disposed so that the other arm thereof moves upwardly in direct lifting relation with said object to be hoisted as said connecting link is pivoted by said thrust transmitting member, and an abutment member interconnecting the links in said pair of link systems which are pivotally connected to said supporting member, said abutment member being adapted to intercept the first named arm of said connecting link as said link is pivoted as described by said thrust transmitting member.

WILLIAM D. SHADWICK.

References Cited in the file of this patent

UNITED STATES PATENTS

| Number | Name | Date |
|---|---|---|
| 1,552,281 | Edwards | Sept. 1, 1925 |
| 1,973,668 | Smith | Sept. 11, 1934 |
| 2,094,521 | Biszantz | Sept. 28, 1937 |
| 2,097,555 | Anthony | Nov. 2, 1937 |
| 2,234,135 | Barrett | Mar. 4, 1941 |
| 2,312,871 | Brick | Mar. 2, 1943 |
| 2,314,531 | Wachter | Mar. 23, 1943 |

FOREIGN PATENTS

| Number | Country | Date |
|---|---|---|
| 457,093 | Germany | Mar. 8, 1928 |